Patent text

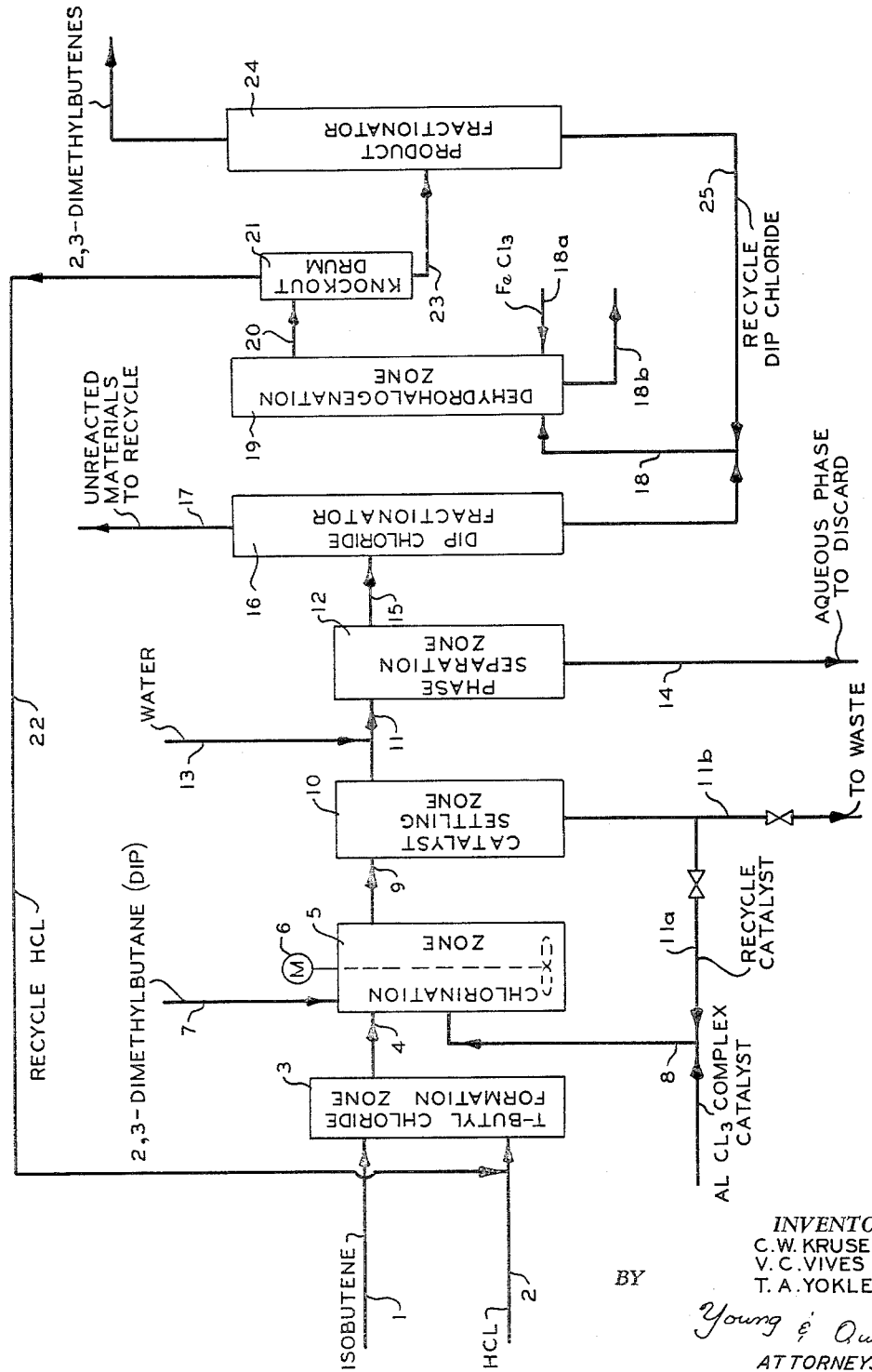

3,247,277
PRODUCTION OF 2,3-DIMETHYLBUTENES
Carl W. Kruse, Van C. Vives, and Tommey A. Yokley, Jr., Bartlesville, Okla., assignors to Phillips Petroleum Company, a corporation of Delaware
Continuation of application Ser. No. 131,231, Aug. 14, 1961. This application Feb. 15, 1965, Ser. No. 432,740
2 Claims. (Cl. 260—677)

This application is a continuation of application Serial No. 131,231, filed August 14, 1961, and now abandoned.

This invention relates to a novel process for the preparation of 2,3-dimethylbutenes and intermediates therefor. One aspect of this invention relates to a novel process for chlorinating 2,3-dimethylbutane with tert-alkyl chlorides. Another aspect of this invention relates to a process for the dehydrochlorination of chlorinated 2,3-dimethylbutane by heating the chlorine-substituted compounds in the presence of $FeCl_3$. A further aspect of this invention relates to the formation of tert-alkyl chloride by hydrochlorination of an olefin and subsequently utilizing same for the chlorination of 2,3-dimethylbutane.

Various processes have been described in the literature for the preparation of 2,3-dimethylbutenes from 2,3-dimethylbutane (diisopropyl). One method is described in U.S. Patent 2,613,233 of D. R. Blumer, issued October 7, 1952. According to that process, 2,3-dimethylbutane is reacted with chlorine to form a mixture of 1-chloro- and 2-chloro-2,3-dimethylbutane. The mixture of chlorides is then subjected to dehydrochlorination, using stainless steel at 115–130° C. to dehydrohalogenate the tertiary chloride, and barium chloride at 500° C. to dehydrohalogenate the primary chloride. The rate of dehydrochlorination of the tertiary chloride over stainless steel is slow, while the primary chloride is not affected to any appreciable degree at these conditions.

It is now discovered that 2,3-dimethylbutenes can be prepared by a process which comprises selectively forming 2-chloro-2,3-dimethylbutane in high yields by chlorinating 2,3-dimethylbutane with tert-alkyl chlorides in the presence of aluminum chloride complex catalyst, thereafter separating the catalyst from the reaction effluent, separating the 2-chloro-2,3-dimethylbutane from the unconverted hydrocarbons, isobutane, and tert-alkyl chloride and dehydrohalogenating the resulting 2-chloro-2,3-dimethylbutane. In addition, it has been found that dehydrochlorination of 2-chloro-2,3-dimethylbutane to the corresponding 2,3-dimethylbutenes can be carried out at a rapid rate by heating said chlorine-substituted compounds to their boiling point in the presence of $FeCl_3$ or a compound which is rapidly converted to $FeCl_3$ in the reaction zone.

It is an object of this invention to provide a new and improved process for the manufacture of 2,3-dimethylbutenes. Another object of this invention is to provide an improved method for the preparation of 2-chloro-2,3-dimethylbutane. Still another object of this invention is to provide a process for the dehydrochlorination of 2-chloro-2,3-dimethylbutane. A still further object of this invention is to provide a method for producing 2,3-dimethylbutenes by the rapid dehydrochlorination of 2-chloro-2,3-dimethylbutane.

Other aspects, objects and the several advantages of this invention are apparent from this disclosure, the drawing and the appended claims.

According to the process of this invention, 2,3-dimethylbutene-1 and -2 are prepared from diisopropyl by a three-step process. The first step comprises the preparation of tert-alkyl chlorides such as tert-butyl chloride by the reaction of an olefin such as isobutene and anhydrous hydrogen chloride. Step two comprises the reaction of the tert-alkyl chloride with diisopropyl to produce 2-chloro-2,3-dimethylbutane, and step three comprises the dehydrohalogenation of the chloride to produce the 2,3-dimethylbutenes. The HCl which is split out by the dehydrohalogenation step is then recycled to the first step.

The reaction of anhydrous HCl with an olefin to produce a tert-alkyl chloride is well known in the art, and is not considered to be a new step in the present process. However, this step is an integral part of the present process since the recycling of HCl allows conservation of the chlorine required.

The dehydrohalogenation step is most conveniently carried out by refluxing the 2-chloro-2,3-dimethylbutane at its atmospheric boiling point in a packed column and in contact with $FeCl_3$. In place of, or in addition to the $FeCl_3$, iron powder or some other physical form of soft iron can be employed, since this material is rapidly converted to $FeCl_3$ by the HCl being split out during the dehydrochlorination reaction. One convenient way of contacting the 2-chloro-2,3-dimethylbutane with the $FeCl_3$ or iron promoter is to add the promoter to the kettle or pot of the packed column in which the refluxing is being carried out.

According to the prior art, the chlorination of 2,3-dimethylbutane by means of tert-butyl chloride in the presence of anhydrous aluminum chloride produces the 2-chloro-2,3-dimethylbutane in yields approximating 23 percent. We have now found that the use of aluminum chloride complex allows us to obtain yields of 50 to 60 percent, and even higher, of this compound. Aluminum chloride reacts with unsaturated hydrocarbons to form liquid complexes, and these complexes are widely used for alkylation. In these complexes, the aluminum chloride is complexed with rather high molecular weight hydrocarbons which result from the reaction of the aluminum chloride with isobutane or other branched paraffin in the presence of olefins such as ethylene. Generally, these liquid aluminum chloride complexes will contain from 55 to 65 weight percent aluminum chloride, the remainder being hydrocarbon.

In the step wherein 2,3-dimethylbutane is chlorinated by means of tert-alkyl chloride, the ratio of 2,3-dimethylbutane to tert-alkyl chloride on a molar basis will be within the range between 0.5:1 and 3:1. The amount of aluminum chloride complex catalyst which will be present during the chlorination step will be within the range between 0.5 and 10 percent, preferably between 1.0 and 5.0 percent, all figures being expressed on a percent by weight of the 2,3-dimethylbutane-tert-alkyl chloride mixture. The chlorination is carried out as a liquid phase chlorination, preferably at temperatures below 100° F. The contact time will be relatively short, and will generally be less than five minutes. A more preferred residence time within the chlorination zone is from 0.05 to 2 minutes. Pressure which will be employed in the chlorination zone can vary from atmospheric to 500 p.s.i.g. or more. The pressure which will be employed will be dependent upon the desired reaction temperature, as pressure will be required to maintain the reactants and products in the liquid phase. The chlorination can be carried out either batchwise or continuous.

In the chlorination step of this invention, the two tert-alkyl chlorides which can be employed are preferably tert-butyl chloride and tert-amyl chloride. The tert-butyl chloride is by far the most preferred, since increased yields are obtained from this chlorinating agent, and the isobutane which is produced by the exchange of the chlorine for a hydrogen atom of the 2,3-dimethylbutane serves to depress the side reactions such as alkylation and disproportionation.

Following the chlorination step, the reaction effluent is then treated for removal of a portion of the aluminum chloride complex catalyst. The reaction effluent can be allowed to stand, and a major portion of the catalyst complex will settle out. The phases can then be separated by decantation and the like, and the product phase can be treated with water to kill the residual catalyst remaining therein. The product phase can then be washed with water and dried, although a drying step is not essential.

For example, in a run in which tert-butyl chloride is used as the chlorinating agent, the product phase will contain tert-butyl chloride, 2-chloro-2,3-dimethylbutane, isobutane, unconverted diisopropyl and various hydrocarbons resulting from the alkylation and disproportionation side reactions. The crude product is then subjected to purification processes such as fractionation. The 2-chloro-2,3-dimethylbutane and heavy byproducts (boiling above about 115° C.) are withdrawn as bottoms from such a fractionation, while the unconverted diisopropyl and other compounds are withdrawn as overhead from this fractionation. The diisopropyl and tert-butyl chloride can be recycled for additional chlorination either prior to or subsequent to a further purification step.

The 2-chloro-2,3-dimethylbutane is then subjected to dehydrohalogenation. The dehydrohalogenation of this compound can be carried out in a variety of ways. One method which can be employed is to contact the compound with $BaCl_2$ at a temperature of from 200° C. to 400° C. (392–756° F.). Another method which can be employed is to dehydrohalogenate this material over stainless steel at the boiling point of the 2-chloro-2,3-dimethylbutane. This dehydrohalogenation temperature will be from 115° C. to 130° C. The preferred method of dehydrohalogenation is to contact the chloride with $FeCl_3$ at a temperature of from 115° to 130° C. By operating according to this procedure, one can effect dehydrohalogenation at lower temperatures than are required using $BaCl_2$ and simultaneously obtain a pure product. In addition, the use of $FeCl_3$ is advantageous because the rate of dehydrohalogenation is much faster than when stainless steel is used.

Preferably, according to this invention, the 2-chloro-2,3-dimethylbutane is heated to a temperature within the range of from 110° C. to 130° C. and contacted with $FeCl_3$ or iron. If this is carried out in a packed column the packing material can be glass, stainless steel or any desired material. Iron packing can be employed but it will be used up as it is converted to $FeCl_3$. Since the use of the promoters of this invention causes the rapid dehydrochlorination to form 2,3-dimethylbutenes, the temperature in the kettle of the fractionation column will fall rapidly from the initial 110° C. to 130° C. range to a level generally within the range between 90° C. and 110° C.

The effluent from the dehydrohalogenation zone can then be passed through a condenser which serves to condense the 2,3-dimethylbutenes and separate them from the HCl being split out by the dehydrohalogenation. Any HCl which is present as dissolved HCl in the hydrocarbon will recombine with the 2,3-dimethylbutenes to reform 2-chloro-2,3-dimethylbutane. The HCl which was separated during the condensation can be recyled to the reaction for the formation of tert-alkyl chloride. The 2,3-dimethylbutenes product stream can be subjected to a final fractionation to separate out the small amount of chlorides which are reformed by the reaction of HCl. These materials can be recycled to the dehydrohalogenation zone.

The process of this invention is more adequately described by reference to the attached drawing. In that figure, isobutene is fed through line 1 and HCl through line 2 to tert-butyl chloride formation zone 3. The effluent from this zone, tert-butyl chloride, is then passed via line 4 to chlorination zone 5. This zone is equipped with a stirrer 6 since agitation of the reaction mixture during chlorination is advantageous. Simultaneously, 2,3-dimethylbutane (diisopropyl) is fed to the chlorination zone via line 7, and aluminum chloride complex catalyst, containing 60 percent by weight aluminum chloride and 40 percent by weight hydrocarbon, is fed to zone 5 via line 8. After a residence time of 0.5 minute at 30° C. (86° F.), the reaction mixture is then passed through line 9 to catalyst settling zone 10. The reaction effluent separates into two phases in this zone, and the hydrocarbon phase is withdrawn from zone 10 via line 11. The catalyst phase is withdrawn from zone 10 through line 11a and can be recycled via line 8 for recharging to the chlorination zone, or can be discarded as desired through line 11b. The hydrocarbon phase is then charged to phase separation zone 12. Immediately prior to entering this zone, a sufficient amount of water is charged through line 13 to line 11 to deactivate the catalyst remaining in the phase. The hydrocarbon and aqueous phases separate in zone 12, and the aqueous phase is withdrawn through line 14 to waste. The hydrocarbon phase is withdrawn through line 15 to the diisopropyl chloride fractionator 16. The feed to this fractionator comprises a mixture of 2-chloro-2,3-dimethylbutane, tert-butyl chloride and various hydrocarbons, including unconverted diisopropyl. The hydrocarbons are taken off overhead through line 17, and the unconverted reactants in this line can be recycled to the chlorination zone. The bottoms from this fractionator, comprising the chloride, is withdrawn through line 18 to dehydrohalogenation zone 19. In this zone, the chloride passes over stainless steel packing at 115° C. It is preferred to add $FeCl_3$ to the pot of column 19 to obtain rapid dehydrohalogenation, in which case packing materials other than SS, e.g. glass, can be used. The $FeCl_3$ is introduced through line 18a when desired. This results in the dehydrohalogenation of the chloride, and the mixture of dimethylbutenes and HCl is withdrawn through line 20 to knockout drum 21. Heavies and $FeCl_3$ are withdrawn from 19 via line 18b. HCl is withdrawn from the knockout drum through line 22 and recycled to line 2 for recharging to the chloride formation zone. Dimethylbutenes are withdrawn from drum 21 through line 23 to product fractionator 24. The overhead from this column comprises the 2,3-dimethylbutenes product of this process, and consists primarily of 2,3-dimethyl-2-butene. The bottoms from this column are withdrawn through line 25 and recycled to line 18 for recharging to the dehydrohalogenation zone. The chlorides which are removed from column 24 through line 25 result from the recombination of HCl with butenes in the knockout drum.

The 2,3-dimethylbutenes which are prepared by the process of this invention have known utility. For example, they may be employed in alkylation processes for the production of other branched-chain hydrocarbons.

The present process has several distinct advantages. For example, the use of tert-alkyl chlorides produces only the 2-chloro-2,3-dimethylbutane, and the dehydrochlorination of this compound can be carried out at much lower temperatures than the dehydrochlorination of 1-chloro-2,3-dimethylbutane. By avoiding high temperatures, we avoid isomerization of the carbon skeleton. Furthermore, the byproducts obtained are, for the most part, alkylation products, as opposed to the polychloro compounds which result when the chlorination is carried out with $Cl_2$. Finally, the present process, in effect, is a reaction in which isobutene serves as a carrier for the chlorine and is also converted to isobutane, whose presence helps to retard side reactions such as alkylation and disproportionation. If the chlorination were carried out with free chlorine, such as the methods of the prior art, one atom of chlorine is converted to HCl during chlorination, and the other atom of Cl is converted to HCl during dehydrochlorination. Thus, one mole of chlorine is required for each olefinic bond produced, and unless means are provided for converting HCl to elemental chlorine, the chlorine is lost. In our process, only one atom of chlorine is required for each olefinic double bond produced per pass, and the atom of chlorine is recycled through the process without substantial loss. A further advantage lies in the use of $FeCl_3$ and its attendant increase in dehydrochlorination rate.

The process of this invention is particularly applicable to the dehydrochlorination of 2-chloro-2,3-dimethylbutane to form 2,3-dimethylbutenes, although mixtures of the 2-chloro-2,3-dimethylbutane with 1-chloro-2,3-dimethylbutane can be employed.

As an additional advantage of this invention it has been found that the purity of the 2,3-dimethylbutenes produced by carrying out the dehydrochlorination in the presence of $FeCl_3$ or iron is much higher than the dehydrochlorinated products from processes employing other catalysts or promoters.

The following specific examples are intended to illustrate the advantages of the process of this invention, but it is not intended that the invention be limited to he particular embodiments shown therein.

EXAMPLE I

A run was carried out in which diisopropyl was reacted with tert-butyl chloride according to the process of this invention. In this run, and all other runs given herein, the tert-butyl chloride was obtained from Eastman Distillation Product Industries and was used without further purification, while Phillips pure grade diisopropyl was used without further purification. The aluminum chloride complex was obtained from a commercial diisopropyl unit wherein isobutane is alkylated with ethylene in the presence of aluminum chloride. This complex contained 58 weight percent aluminum chloride, the remainder being hydrocarbon. It had previously been stabilized by heating to 140° F. to remove dissolved HCl and low boiling hydrocarbons.

In this run and all other runs described herein, the reported concentrations of products were determined by gas-liquid chromatographic analysis. These analyses were obtained at room temperature on a five foot, DC–200 Silicone on Celite column in a Model 1111 Hallikainen chromatograph.

One run was carried out in a batchwise operation. In this run, 53.6 grams (0.58 mole) of tert-butyl chloride and 100 grams (1.16 mole) of diisopropyl were charged to a 1-liter separatory funnel. To the mixture was then added 3.9 grams of the aluminum chloride complex described above. This reaction was carried out at room temperature (approximately 25° C.). The mixture was then shaken vigorously for a few seconds, and the pressure was relieved by venting to atmospheric pressure. This agitation-venting cycle was repeated several times. After 45 seconds, the oil phase was decanted quickly into about 100 ml. water. After phase separation, the oil was washed with more water, then with 5 percent by weight aqueous $Na_2CO_3$, and finally with water. The oil which separated amounted to 135.8 grams. This oil was then dried over anhydrous potassium carbonate, and the dry oil, 125.5 grams refractive index $n_D^{20}$ 1.3854, was distilled rapidly in a glass fractionating column packed with glass helices. A small stream of dry nitrogen gas was passed through the distillation pot to prevent the accumulation of hydrogen chloride. A fraction boiling at a head temperature of 105° C. to 112° C. and amounting to 26.8 grams was 99 percent 2-chloro-2,3-dimethylbutane. This material had a refractive index of $n_D^{20}$ of 1.4170. The total amount of 2-chloro-2,3-dimethylbutane obtained from all of the fractionation cuts was 33.3 grams. This represents 48 percent of theoretical, while the ultimate yields, calculated from conversion, were 72 percent based on tert-butyl chloride and 64 percent based on diisopropyl.

EXAMPLE II

In another series of runs, 2,3-dimethylbutane was reacted with tert-butyl chloride in a continuous manner.

In these runs, a mixture of diisopropyl and tert-butyl chloride was introduced at atmospheric pressure into the bottom of a vertical glass tube containing packing material saturated with aluminum chloride complex. Fresh complex was also introduced at the top of the bed in the column.

The following procedure is a detailed description of the procedure for run 1 in the following table. This is a typical procedure, and the changes between runs are shown in the columns of the table. In this run, 10 mesh bauxite was dried at 1100° C. to 1200° C. for one to two hours. A 70.9 gram portion of the bauxite was mixed with 20.3 grams of aluminum chloride complex, and the resulting mixture was charged to a 9/16 inch I.D. glass tube to a depth of 15 inches. The volume of the catalyst charged was approximately 61 cc. and the void space was 22 cc. Aluminum chloride complex was then dropped onto the catalyst bed and was allowed to seep downward until it had reached 4 inches from the bottom. A solution of 33.8 grams (0.36 mole) of tert-butyl chloride in 100.3 grams (1.15 mole) of diisopropyl was then introduced under nitrogen pressure at the bottom of the catalyst bed over a 15-minute period at a uniform rate. Gas evolution caused some of the aluminum chloride complex to work its way back up the column. At the end of this time, the column was then washed free of alkyl chloride with diisopropyl.

The turbid product was then passed into water, and the hydrocarbon phase was separated, dried over sodium carbonate and distilled rapidly in a fractionating column at atmospheric pressure. The distillate was collected in two portions, fraction 1 boiling from 46° C. to 85° C. and amounting to 99.5 grams; fraction 2 boiling from 85° C. to 110° C. and amounting to 9.4 grams. The refractive index of fraction 2 was $n_D^{20}$ 1.4158. Gas chromatographic analysis showed fraction 1 to contain 10.8 weight percent tert-butyl chloride, 78.8 weight percent diisopropyl and 4.2 weight percent 2-chloro-2,3-dimethylbutane. Fraction 2 contained 0 weight percent tert-butyl chloride, 4.8 weight percent diisopropyl, 92.9 weight percent 2-chloro-2,3-dimethylbutane and 2.3 weight percent 2,3-dimethyl-2-butene. The yield of 2-chloro-2,3-dimethylbutane was 12.9 grams or 29 percent per pass yield based on tert-butyl chloride. Based on 10.7 grams of recovered tert-butyl chloride, the ultimate yield of product was 43 percent.

In the following table, run 2 was made with the same bauxite-complex packing, while in runs 3 and 4, a glass tube 27 inches long by 22 mm. I.D. was packed to a depth of 20 inches with 6 mm. glass beads. The complex was then passed down through the beads while a bellows-type pump was used to introduce the hydrocarbon-chloride mixture at the bottom at a constant rate. The results of these runs are expressed below as Table I.

Table I

| Run No. | Mole Ratio Diisopropyl/ tert-butyl Chloride | Residence Time, minutes | Percent Yield based on Tert-butyl Chloride | |
|---|---|---|---|---|
| | | | Per Pass | Ultimate |
| 1 | 3:1 | 1.7 | 29 | 43 |
| 2 | 3.8:1 | 0.3 | 21 | 75 |
| 3 | 2:1 | 1.2 | 18 | 23 |
| 4 | 4:1 | 3.8 | 43 | 46 |

EXAMPLE III

In still another series of runs, 2,3-dimethylbutane was chlorinated with tert-butyl chloride in the presence of aluminum chloride complex. In these runs, the chlorination was carried out on a continuous basis.

The reactor employed in these runs was constructed from a stainless steel centrifugal pump. A glass reservoir was connected to the pump and charged with the diisopropyl/tert-butyl chloride mixture, while another glass reservoir was charged with aluminum chloride complex.

Nitrogen gas was introduced above the hydrocarbon-chloride solution to maintain the desired pressure and the rate of flow was controlled through an exit valve. A higher pressure was maintained above the catalyst reservoir to assure no backup through the needle valve which was used to regulate the rate of catalyst addition. The reactants were admitted to a tube loop connecting the outlet of the pump to its intake. The reactants were admitted to the loop near the pump inlet and the products were withdrawn near the exit side of the pump.

The following procedure is described in detail for run 8 of the following table. This description is typical. In this run, the reactor exit was connected to a weighed 2-liter suction flask followed by a trap, HCl absorber, gas sampling bulb, and wet test meter in that order. The hydrogen chloride absorber was filled with 80 ml. of 1.29 N sodium hydroxide. The 2-liter flask and trap were cooled with ice water. A 2:1 molar ratio mixture of diisopropyl and tert-butyl chloride was added to the hydrocarbon reservoir and the reaction loop until the entire system was liquid full. The 2 ml. portion of $AlCl_3$ complex was then added from the catalyst reservoir under 50 p.s.i.g. nitrogen pressure, after which the pressure in the reaction system was raised to 40 p.s.i.g. A stop watch was started, and the catalyst was admitted at 2 ml. per minute. After 30 seconds, the outlet valve was opened to remove 200 ml. per minute. Both valves were closed after 5.5 minutes. The graduated reservoir showed that 1000 ml. of DIP/tert-butyl chloride solution and 13 ml. of catalyst had been charged. The weight of material in the 2-liter flask and trap was 702.1 grams. The wet test meter reading was 3.25 liters, which when corrected for product volume of 1 liter, amounted to approximately 0.90 mole of gas. The hydrogen chloride neutralized was 0.5 gram. The total weight of gaseous and liquid products was 707.8 grams.

The 702.1 grams of liquid product was treated with a small amount of water which facilitated the separation of the catalyst. The hydrocarbon phase was shaken vigorously with an equal volume of water and dried over anhydrous potassium carbonate. A 131.5 gram portion of the dry oil, the total of which amounted to 655.4 grams, was distilled rapidly at atmospheric pressure in a fractionation column. The effluent from the fractionation was then subjected to analysis by gas chromatography. In the first column of the following analysis table, the quantities of components in the product stream are listed. In the second column, the amounts of products are shown corrected for evaporation and drying losses. These corrected values are based on the assumption that evaporation losses are 80:10:10 weight percent mixture of isobutane, DIP and tert-butyl chloride; that the theoretical quantity (17 grams) of catalyst was washed out with water; that 15 grams was lost in drying, and 13.7 grams was evaporation loss.

PRODUCT ANALYSIS FROM RUN 8

| Compound | Observed Quantities, grams | Corrected Quantities, grams |
|---|---|---|
| Gas evolved | 5.2 | |
| HCl | 0.5 | 0.5 |
| Catalyst, evaporation and drying loss | 46.7 | |
| Catalyst | | 17 |
| Distillation residue | 11.5 | 11.5 |
| Distillation loss | 20.5 | |
| Isobutane | 82.3 | 116.1 |
| Isopentane | 1.7 | 1.8 |
| tert-Butyl chloride | 67.7 | 73.0 |
| Diisopropyl | 287.4 | 298.6 |
| 2,3-dimethyl-2-butene | 1.1 | 1.1 |
| tert-Amyl chloride | 1.7 | 1.8 |
| 2-chloro-2,3-dimethylbutane | 181.5 | 186.4 |
| | 707.8 | 707.8 |

Base on the above tabulation, the yield per pass based on tert-butyl chloride was 58 percent observed and 59 percent corrected. The ultimate yields based on tert-butyl chloride were 80 percent observed and 85 percent corrected. The ultimate yields based on diisopropyl were 80 percent observed and 89 percent corrected.

The runs which were carried out by this continuous procedure are expressed as Table II. All runs were carried out at a 2:1 molar ratio of DIP/tert-butyl chloride except as indicated.

Table II

PREPARATION OF 2-CHLORO-2,3-DIMETHYLBUTANE

| Run No. | Catalyst (Wt. Percent) | Residence Time (min.) | Yield of Chloride | | | Mat'l. Bal. Percent) | By-Products | | HCl (Wt. Percent) |
|---|---|---|---|---|---|---|---|---|---|
| | | | Per Pass, Percent | Ultimate | | | Hi-Boil (Wt. Percent) | Iso $C_5$ (Wt. Percent) | |
| | | | | Percent Cl | Percent DIP | | | | |
| 5 | 4.3 | 1.3 | 54 | 70 | 64 | 85 | 2.7 | 2.2 | |
| 6 | 6.5 | 3.2 | 44 | 55 | 43 | 68 | 2.2 | 3.2 | |
| 7 | 3.3 | 1.2 | 52 | 73 | 70 | 88 | 2.6 | 1.4 | |
| 8 | 2.4 | .5 | 58 | 80 | 80 | 93 | 1.6 | .4 | |
| 9a | 2.3 | .5 | 14 | 60 | 60 | 95 | 1.4 | .4 | .07 |
| 10b | 2.5 | .5 | 58 | 82 | 71 | 93 | 2.0 | .9 | |
| 11b | 2.0 | .25 | 61 | 87 | 74 | 95 | 1.6 | .3 | .87 |
| | | | | | | | | | 1.4 |

CORRECTED FOR EVAPORATION AND DRYING LOSSES

| 8 | 2.4 | .5 | 59 | 85 | 89 | 100 | 1.6 | .4 | .07 |
| 9a | 2.3 | .5 | 14 | 69 | 69 | 100 | 1.6 | .4 | |
| 10b | 2.5 | .5 | 60 | 88 | 79 | 100 | 2.0 | .9 | .87 |
| 11b | 2.0 | .25 | 61 | 90 | 76 | 100 | 1.6 | .3 | 1.4 | a Molar ratio of DIP/t-butyl chloride charged: 1:1.
b Runs 10 and 11 contained 0.54 and 1.3 weight percent, respectively, dissolved in the DIP/t-butyl chloride solution.

EXAMPLE IV

In a control run, a batch run was carried out by the procedure of Example I in which a 2:1 molar solution of 2,3-dimethylbutane and tert-butyl chloride was contacted with 6.5 weight percent anhydrous aluminum chloride at 0.5 minute. The yield of 2-chloro-2,3-dimethylbutane was 28 percent of theoretical.

It can be seen by comparing this run with the runs of the above examples that increased yields are obtained by use of the aluminum chloride complex catalyst of this invention.

EXAMPLE V

A series of runs was carried out in which 2-chloro-2,3-dimethylbutane was subjected to dehydrochlorination over stainless steel. These runs were carried out in a distillation column of about ⅝-inch I.D. and 18 inches long.

The column was packed with ¼-inch stainless steel Penn State packing.

As the pure tertiary chloride (2-chloro-2,3-dimethylbutane) was refluxed in the column, the head temperature decreased as the olefins were formed. The olefins were removed until the head temperature rose above the boiling point of the 2,3-dimethyl-2-butene (73° C.). The removal of the olefins was automatically controlled by a Niagara Thermocap Relay used in conjunction with a magnetic takeoff. The results of these runs are expressed as Table III. In Runs 13 and 14, 100 grams of the chloride were employed, while 50 grams were used in Run 12.

*Table III*

2-CHLORO-2,3-DIMETHYLBUTANE DEHYDROCHLORINATION

| Run No. | Stainless Steel in pot (grams) | 2,3-dimtehylbutenes | | Ratio 2-ene: 1-ene | Yield of Butenes Based on t-DIP Cl | | Heavies | | Percent Conversion of Tertiary Mono-Chloride |
|---|---|---|---|---|---|---|---|---|---|
| | | Wt. (g.) | Moles | | Batch | Ultimate | Wt. (g.) | Wt. percent | |
| 12 | 10.0 | 22.6 | 0.27 | 3.8:1 | 64.6 | 80.3 | 3.5 | 7.0 | 80.4 |
| 13 | 0 | 51.9 | 0.62 | 2.9:1 | 74.3 | 88.9 | 7.9 | 7.9 | 83.4 |
| 14 | 0 | 55.4 | 0.67 | 3.9:1 | 79.3 | 90.3 | 4.4 | 4.4 | 87.1 |

EXAMPLE VI

In another series of runs, 2-chloro-2,3-dimethylbutane was dehydrochlorinated over barium chloride.

The apparatus employed in these runs consisted of a vertical Pyrex tube 19 mm. I.D. by 12.5 inches long. This tube was fitted with a 4 mm. O.D. Pyrex thermowell in the center. A 10 ml. burette was used to meter the chloride into the top of the tube, while nitrogen was introduced at the point of chloride addition. A shallow bed of Burl saddles was placed at the bottom of the tube with about 30 ml. of catalyst ($BaCl_2$) above this. The remainder of the tube was filled with glass beads to form a preheat zone. The reaction tube was placed vertically in an electrical furnace for heating, and a 25 ml. receiver was placed at the bottom of the reactor tube and immersed in an ice bath. This receiver contained about 22 ml. of NaOH solution through which the effluent passed. This neutralized the HCl, thus preventing its recombination with the olefin. A Dry Ice trap was connected to the receiver.

The barium chloride used was Bakers Analytical $BaCl_2 \cdot 2H_2O$, C.P. grade. The pure tertiary chloride was obtained by the procedure of Example III.

Prior to charging the chloride to the column, the catalyst was prepared by charging 30 cc. of $BaCl_2 \cdot 2H_2O$ to the reactor and heating for 15 hours at 200° C. to remove water. Nitrogen was then continuously flushed through the reactor during and between runs. After the catalyst had been dried, the reactor was heated to the desired reaction temperature after which the chloride feed was slowly metered in from the burette. The effluent which was collected was dried over Drierite and analyzed by gas-liquid phase chromatography. The analytical procedure was the same as described previously.

The results of these runs are expressed below as Table IV:

EXAMPLE VII

In other runs, 2-chloro-2,3-dimethylbutane, prepared by the method of Example III, was subjected to dehydrochlorination.

In one run, the dehydrochlorination of 100 g. of the compound by refluxing over new stainless steel packing required 12.5 hours. In the presence of $FeCl_3$, the dehydrochlorination rate was increased fivefold.

In another run in which $FeCl_3$ was added to the pot of a fractionating column in which 2-chloro-2,3-dimethylbutane was being refluxed over stainless steel packing, it was noted that the pot temperature was lowered from 112°–115° C. to 97°–105° C. by the addition of the $FeCl_3$. The same lowering of temperature was noted when powdered iron was added instead of $FeCl_3$. This indicates that the olefins were formed in the pot almost immediately upon the addition of the $FeCl_3$ or iron.

EXAMPLE VIII

Two pound moles (112 pounds) of isobutene and two pound moles (73 pounds) of anhydrous HCl are reacted together at 0° C. and a substantially quantitative yield of tert-butyl chloride is obtained. The produced tert-butyl chloride, 185 pounds or 2 pound moles, is then charged to a chlorination zone and reacted with 344 pounds (4 pound moles) of 2,3-dimethylbutane (DIP). The chlorination is carried out at 25° C. for 2 minutes in the presence of 20 grams of the aluminum chloride complex catalyst of Example I. The reaction mixture is then allowed to settle and the catalyst phase is separated and saved for use in subsequent chlorination. The hydrocarbon phase is treated with a small quantity of water, and the aqueous phase is separated and discarded. The hydrocarbon remaining is fractionated and 144.6 pounds (1.2 pound moles) of 2-chloro-2,3-dimethylbutane is withdrawn as bottoms. The overhead, consisting of unreacted tert-butyl chloride, isobutane, and DIP is returned to the chlorination zone.

The 2-chloro-2,3-dimethylbutane is then charged to a fractionator kettle and to this material is added 0.1 pound of $FeCl_3$. The mixture is then heated to 110° C., and a mixture of HCl and 2,3-dimethylbutenes passes overhead to a condenser. The 2,3-dimethylbutenes are condensed out, along with a small amount of 2-chloro-2,3-dimethylbutane which is formed by recombination of 2,3-dimethylbutene with HCl, while the HCl, amounting to 33 pounds (0.904 mole) is recycled for reaction with additional isobutene. The condensate is fractionated and 76 pounds (0.904 mole) of 2,3-dimethylbutenes is recovered

*Table IV*

DEHYDROCHLORINATION OF 2-CHLORO-2,3-DIMETHYLBUTANE OVER $BaCl_2$

| Run No. | Temp., ° C. | Feed Rate ml./hr. | Conversion, Percent | Batch Yield, Percent | Ultimate Yield, Percent | Material Balance | Percent Product Purity [1] |
|---|---|---|---|---|---|---|---|
| 15 [2] | 300 | 13.6 | 95.1 | 78.4 | 82.1 | 86.8 | 95.3 |
| 16 [2] | 300 | 26.5 | 100 | 90.0 | 90.0 | 96.9 | 99.7 |
| 17 [2] | 200 | 17.0 | 84.3 | 72.1 | 85.6 | 90.8 | 96.2 |

[1] Weight percent 2,3-dimethyl-1-butene and -2-butene in the total olefin fraction.
[2] Run 15 was made using one catalyst charge and Runs 16 and 17 were carried out with a different catalyst charge.

from the overhead. The bottoms from this column, comprising 42.8 pounds (0.296 pound mole) of 2-chloro-2,3-dimethylbutane, is recycled to the dehydrochlorination step. The product, 2,3-dimethylbutenes, comprises 60 pounds of 2,3-dimethyl-2-butene and 16 pounds of 2,3-dimethyl-1-butene.

The following equations will serve further to illustrate the reactions of this invention:

(1) 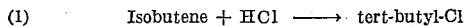

(2) 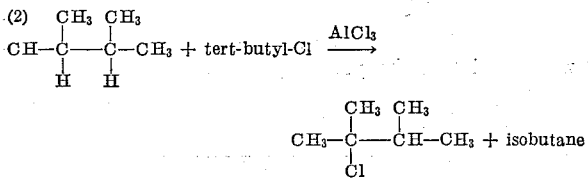

(3) 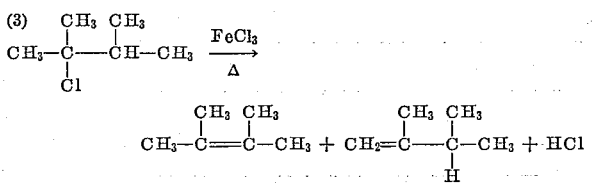

Reasonable variation and modification are possible within the scope of the foregoing disclosure the essence of which is that there is now provided an improved process for the production of 2,3-dimethylbutenes which comprises (a) preparing a tert-alkyl chloride reaction of an olefin and anhydrous hydrogen chloride, (b) reacting the tert-alkyl chloride with diisopropyl to produce 2-chloro-2,3-dimethylbutane, and (c) subsequently dehydrohalogenating the resulting chloride.

We claim:

1. A process for the production of 2,3-dimethylbutenes which comprises the steps of (a) preparing a tert-alkyl chloride selected from the group consisting of tert-amyl chloride and tert-butyl chloride by reacting the corresponding olefin with anhydrous hydrogen chloride, (b) reacting at a temperature of about 100° F. and a pressure in the range of from atmospheric to about 500 p.s.i.g. said tert-alkyl chloride with diisopropyl in the presence of 0.5 to 10 percent by weight of an aluminum chloride complex catalyst formed by the reaction of aluminum chloride with a branched paraffin in the presence of an olefin wherein the diisopropyl and tert-alkyl chloride are present within the molar ratio range of between 0.5:1 to 3:1 so as to produce 2-chloro-2,3-dimethylbutane, (c) subjecting said 2-chloro-2,3-dimethylbutane to dehydrohalogenation in the presence of $FeCl_3$ and (d) subsequently recovering the 2,3-dimethylbutenes and recycling the hydrogen chloride.

2. A process for the production of 2,3-dimethylbutenes which comprises the steps of (a) preparing a tert-alkyl chloride by reacting an olefin with anhydrous hydrogen chloride, (b) reacting said tert-alkyl chloride with diisopropyl in the presence of an aluminum chloride complex catalyst formed by the reaction of aluminum chloride with a branched paraffin in the presence of an olefin so as to produce 2-chloro-2,3-dimethylbutane, (c) subjecting said 2-chloro-2,3-dimethylbutane to dehydrohalogenation at a temperature in the range of about 90° C. to about 130° C. in the presence of $FeCl_3$ and (d) subsequently recovering the 2,3-dimethylbutenes as a product of the process.

References Cited by the Examiner
UNITED STATES PATENTS

| | | | |
|---|---|---|---|
| 2,065,323 | 12/1936 | Thomas et al. | 260—677 |
| 2,474,827 | 7/1949 | Condon | 260—658 |
| 2,613,233 | 10/1952 | Blumer | 260—677 |

OTHER REFERENCES

Huntress, Organic Chlorine Compounds, John Wiley and Sons, Inc., 1948, pages 955–956, 1054–1055.

Thomas, Anhydrous Aluminum Chloride in Organic Chemistry, Reinhold Pub. Co., 1941, pages 47–54.

ALPHONSO D. SULLIVAN, *Primary Examiner*

PAUL M. COUGHLAN, *Examiner.*